Patented Dec. 26, 1939

2,185,140

UNITED STATES PATENT OFFICE 2,185,140

DYESTUFFS OF THE ANTHRAQUINONE BENZACRIDONE SERIES

Wilhelm Bauer, Leverkusen-Wiesdorf, Germany, assignor to General Aniline Works, Inc., New York, N. Y., a corporation of Delaware No Drawing. Application March 2, 1937, Serial No. 128,603. In Germany March 4, 1936

3 Claims. (Cl. 260—277)

The present invention relates to new anthraquinone-benzacridones.

My new products may be defined as 4-aroylaminoanthraquinone - 6' - halogenbenzacridones, wherein chlorine is a preferred halogen and the aroyl group preferably is of the benzene series. These new products are valuable vat dyestuffs which, depending on the nature and position of further substituents which may be present in the molecule, show blue to violet-blue shades. Thus, the presence of further halogen atoms in 4'-position effects a remarkable change towards violet. My new dyestuffs are for the most part soluble in high boiling organic solvents with deep blue to violet-blue coloration and precipitate therefrom on cooling in form of violet needles. They are soluble in concentrated sulfuric acid with an orange-red coloration. They are capable of being vatted, the solution of the vatted dyestuffs showing likewise a violet coloration. The dyeings and prints obtained from my new dyestuffs on vegetable fibers are characterized by their being excellently stable towards chlorine and towards boiling.

The following formula of the 4'-benzoylaminoanthraquinone-6'-chlorobenzacridone:

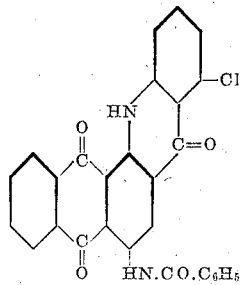

serves to illustrate the nature of my new compounds. It is to be understood that such compounds as contain instead of the —CO.C₆H₅ group a dicarboxylic acid radical such as a phthalic acid radical connected with two 4-aminoanthraquinone-6'-halogenbenzacridone radicals are intended to fall within the scope of the above given definition for my new products. As pointed out in the preceding paragraph aroyl groups of the benzene series are preferably employed. However, those of other aromatic series such as of the naphthalene, diphenyl or anthraquinone series are not excluded from my invention. The aroyl groups may contain further substituents such as halogen atoms or alkoxy groups.

My new products can be prepared by starting from 4-amino-1-anilidoanthraquinone -3'- halogen-2'-carboxylic acids or the functional derivatives thereof or the corresponding 3-sulfonic acids and causing the same to undergo ring closure to the acridone according to usual methods. The amino group in 4-position may be aroylated either prior to or after the ring closure. Ring closure can be effected, for instance, by starting from the carboxylic acid chlorides while employing aluminum chloride as condensing agent or by starting from the carboxylic acid ester and reducing the same to the vat, or by starting from the free carboxylic acid and causing sulfuric acid or chlorsulfuric acid to react thereupon. Aroylation of the 4-amino group is preferably effected by means of the acid chlorides in a high boiling indifferent solvent such as nitrobenzene.

The following examples illustrate the invention without, however, restricting it thereto the parts being by weight:

Example 1

| | Parts |
|---|---|
| 1-amino-4-benzoylaminoanthraquinone | 34 |
| 2-bromo-6-chlorobenzoic acid ester (colorless crystals of fusing point 56° and boiling point 146° at 12 mm. pressure) | 30 |
| Anhydrous potassium acetate | 11 |
| Copper acetate | 1 |
| Naphthalene | 100 | are heated for 3½ hours to 210° C. while thoroughly stirring. On diluting with 100 parts by volume of chlorobenzene the still warm reaction mixture is freed from the inorganic salts by filtration and then allowed to cool, whereupon, on prolonged standing, the reaction product precipitates. It is isolated by suction. On removing the solvents by vapor distillation further quantities of the reaction product can be obtained from the mother liquor. The 4-benzoylaminoanthraquinone-1-anilidoanthrachinone - 3' - chloro-2'-carboxylic acid methylester of the following formula:

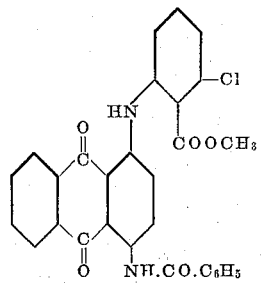

represents violet needles which are easily soluble in hot chlorobenzene from which they can be recrystallized. In order to transform the reaction product into the acridone 30 parts of the finely divided ester and a small quantity of alcohol are stirred into a paste and vatted with the addition of 50 parts of sodium hydrosulfite, 75 parts by volume of a 33% sodium lye and 1.5 liters of water at 60° C. and kept at 40° C. for ½ hour. The clear violet vat thus obtained is blown by means of air whereupon the blue dyestuff is sucked off, rinsed and dried. For purification it can be redissolved from hot nitrobenzene, bluish-violet long needles being thus obtained which are soluble in hot nitrobenzene with a bluish coloration which turns to orange when pouring them into concentrated sulfuric acid. From the reddish-violet hydrosulfite vat textile fibers are dyed, after oxidation, vivid bluish shades of good fastness to chlorine and to boiling.

*Example 2*

80 parts of 2-amino-6-chlorobenzoic acid are dissolved by means of 40 parts of a 33% sodium lye in 2000 parts of water of 80° C. To this mixture 85 parts of the potassium salt of 1-brom-4-amino-anthraquinone-3-sulfonic, 40 parts of sodium acetate and 6 parts of cuprous chloride are added whereupon the whole mixture is heated to 80° C. while thoroughly stirring for 5 hours. On filtration the blue reaction product thus formed is salted out. The sodium salt of the 4-amino-3-sulfonic-1-anilido-anthraquinone-3'-chloro-2'-carboxylic acid of the following formula:

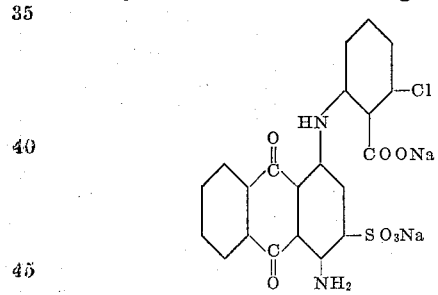

thus obtained is dissolved in hot water and, after filtration, precipitated by means of dilute hydrochloric acid. When stirring the separated product for a prolonged time it assumes a crystalline character; it is sucked off, rinsed with dilute hydrochloric acid and dried.

In order to transform the reaction product into the acridone 20 parts of the dry acid are dissolved in 300 parts of sulfuric acid monohydrate and then heated to 80° C. whereby the originally deeply blue colored reaction mixture turns to orange-red. The ring closure is accompanied by a splitting off of the sulfonic group. Thereupon the mixture is heated for ½ hour and is then poured into water. The bluish dyestuff thus obtained is sucked off, rinsed with hot water while adding some alkali and is then thoroughly rinsed with hot water for a second time. The amino acridone thus obtained dyes fibers from a brownish-red vat greenish-blue shades.

For aroylation 20 parts of the finely powdered dyestuff are heated to boiling together with 10 parts of 4.6-dichloro-benzoylchloride in 500 parts of nitrobenzene, the dyestuff being dissolved thereby while assuming a bluish shade. On cooling the aroylated dyestuff separates in violet needles. Fiber is dyed from the reddish-violet vat vivid blue shades of an excellent fastness to boiling and to chlorine.

If the 4-6-dichlorobenzoylchloride is replaced by para-bromo- or para-chlorobenzoylchloride, dyestuffs of similar shades and an excellent fastness to boiling are obtained. The corresponding dyestuff obtained from meta-methoxybenzoylchloride is characterized by its excellent fastness to light, the shade being unchanged. Dyestuffs of similar properties are obtained from β-naphthoylchloride and diphenyl carboxylic acid chloride, the shades being somewhat changed towards green, whereas the dyestuff obtained from 2.5-dichlorobenzoylchloride shows a reddish-blue shade. I have furthermore employed 1-amino-anthraquinone-2-carboxylic acid chloride and have found that the dyestuff obtained therefrom shows a dark violet shade.

*Example 3*

| | Parts |
|---|---|
| Finely powdered 4-aminoanthraquinone-2-1-(N)-1'-2'(N)-6'-chlorobenzeneacridone | 37.5 |
| Isophthaloylchloride | 10.2 |
| Dry nitrobenzene | 800 | are heated while stirring.

At 120° C. the reaction mixture becomes thick, at 170° C., however, it has already converted into a thin state. On heating for 1 hour to 190° C. the mixture is allowed to cool whereupon the dyestuff already precipitated in the heat is separated at 120-130° C.; it is rinsed and dried in the usual manner. The dyestuff thus obtained represents a blue powder which, on oxidizing, dyes vegetable fiber from a violet hydrosulfite vat clear blue shades of excellent fastness to chlorine, boiling and light.

*Example 4*

64 parts of the 4-amino-3-sulfonic-1-anilidoanthraquinone-3'-chloro-2'-carboxylic acid as described in Example 2 are dissolved in 1000 parts of water and 43 parts of soda. 29.5 parts of hydrosulfite and, after stirring for ¼ hour, 55 parts by volume of sodium lye of 33% are added thereto at room temperature. The blue sodium salt of the 4-amino-1-anilidoanthraquinone-3'-chloro-2'-carboxylic acid of the following formula:

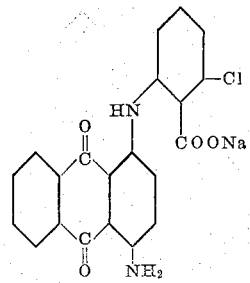

thus formed is salted out, sucked off and redissolved in water. From this solution the free carboxylic acid is separated by means of excess mineral acid such as hydrochloric acid; it is sucked off, washed neutral and dried. 10 parts of the blue powder thus obtained are introduced at room temperature into 10 times its quantity of chlorosulfonic acid and heated for 2 hours at 30° C. The brown solution obtained thereby is poured onto ice, whereupon the separated dyestuff is sucked off, rinsed and dried. The final products are then obtained by an acylating process as described in Examples 2 and 3.

*Example 5*

When replacing the 2-amino-6-chlorobenzoic acid as described in Example 2 by the 2-amino- 4.6-dichlorobenzoic acid and working up according to the directions given in this example a 4-aminoanthrachinon -2-1-(N)-1'-2'-(N)-4'-6'-dichlorobenzene acridone is obtained which is soluble in concentrated sulfuric acid with an orange coloration, vegetable fibers being dyed therewith from a violet vat clear greenish-blue shades.

When aroylating the product thus formed with benzoylchloride or p-chlorobenzoylchloride as described in Example 2 dyestuffs are obtained which dye cotton from a violet vat very clear violet shades of excellent fastness to chlorine, boiling and light.

In an analogous manner there can be obtained from the 2-amino-3-6-dichlorobenzoic acid the 4-aminoanthraquinone - 2-1 - (N) - 1'-2'-(N) -3'-6'-dichlorobenzene acridone. It represents a blue powder which is soluble in sulfuric acid with an orange coloration and which dyes fiber from a violet vat greenish-blue shades. On aroylation with aromatic acid chlorides dyestuffs are obtained which yield from a violet vat clear blue shades of excellent fastness properties.

I claim:

1. 4- para - chlorobenzoylaminoanthraquinone-6'-chlorobenzacridone.

2. 4- para - bromobenzoylaminoanthraquinone-6'-chlorobenzacridone.

3. A 4 - para - halogenbenzoylaminoanthraquinone-6'-chlorobenzacridone, wherein the halogen atom is a member selected from the group consisting of chlorine and bromine and wherein said chlorine substituent is the only substituent in the Bz-radical.

WILHELM BAUER.